United States Patent [19]

Colwell, Jr.

[11] Patent Number: 5,004,539

[45] Date of Patent: Apr. 2, 1991

[54] SUPERCONDUCTING MAGNETIC SEPARATOR

[75] Inventor: Joseph G. Colwell, Jr., Thomson, Ga.

[73] Assignee: J. M. Huber Corporation, Borger, Tex.

[21] Appl. No.: 420,760

[22] Filed: Oct. 12, 1989

[51] Int. Cl.[5] ............................................ B01D 35/06

[52] U.S. Cl. .................................... 210/222; 210/456; 209/223.1; 209/232

[58] Field of Search ............... 210/222, 223, 695, 456; 55/100; 209/223.1, 232

[56] References Cited

U.S. PATENT DOCUMENTS

| | | | |
|---|---|---|---|
| 2,074,085 | 3/1937 | Frantz | 210/223 |
| 3,346,116 | 10/1967 | Jones | 210/222 |
| 3,471,011 | 10/1969 | Iannicelli et al. | 209/214 |
| 4,304,667 | 12/1981 | Dubourg | 210/223 |
| 4,356,093 | 10/1982 | Abercrombie, Jr. et al. | 210/695 |
| 4,363,729 | 12/1982 | Yano | 210/223 |
| 4,668,383 | 5/1987 | Watson | 210/222 |
| 4,668,591 | 5/1987 | Minemura et al. | 209/223.1 |
| 4,702,825 | 10/1987 | Selvaggi et al. | 209/232 |

*Primary Examiner*—W. Gary Jones
*Attorney, Agent, or Firm*—Wall and Roehrig

[57] ABSTRACT

Superconducting magnetic separator has a canister that includes upper and lower pole pieces and a support post or tube extending axially between the pole pieces to absorb and resist the compressive forces imparted by the strong magnetic fields of the superconducting magnet. The support post has one or more axial passages therein for conducting a slurry of water and kaolin which exits the post through openings distributed over the surface thereof. The slurry flows radially through a matrix or packing of a filamentous magnetic material, such as stainless steel wool. The slurry exits through an outlet tube by passing through or around one of the pole pieces.

6 Claims, 2 Drawing Sheets

SUPERCONDUCTING MAGNETIC SEPARATOR

BACKGROUND OF THE INVENTION

The invention relates to the separation of impurities from materials. This invention is more specifically directed to magnetic separation, and particularly to magnetic removal of rather susceptible minute particles, often present in minor concentrations as coloring impurities, from aqueous slurries of minute particles such as are obtained by dispersing clay; e.g., a crude kaolin clay, in water.

The iron content of commercial deposits of kaolin clay is generally on the order of about 0.2% to 2%. Authorities disagree whether the iron contaminants are in discrete form or in a combined form within a kaolin lattice structure. While the form of this iron in clay remains in dispute, recent evidence indicates that some portion of it may be associated with non-kaolin contaminants such as titanium oxides, etc. Iron contamination reduces brightness in clay, and the degree of discoloration of the clay generally increases with the amount of iron present.

Attempts to remove iron contaminants from kaolin by magnetic treatments have been attempted, but few have been notably successful. Wet magnetic separators of the prior art, such for example as described in U.S. Pat. No. 2,074,085, e.g., removed only a small portion of the iron present in or on kaolin. A wet magnetic separator, such as disclosed in U.S. Pat. No. 3,346,116, with increased field strength, did stimulate interest in the potential of magnetic separation.

U.S. Pat. No. 3.471,011 sets out as conditions for magnetic beneficiation of kaolin clay that a slurry of the clay in water ought to be subjected to a high intensity magnetic field of at least 8,500 gauss and be retained in this field for from 30 seconds to 8 minutes in order to separate particles of low magnetic susceptibility from the slurry.

Magnetic separation utilizes the forces of a magnetic field gradient to cause differential movements of mineral grains through the field. Differences in the magnetic permeability of minerals or other discrete particles form the basis for separation, but separation is also influenced by particle size and mass of the mineral grains or particles, by random collisions, by the characteristics of the medium, and by the mechanical and electrical characteristics of the separator.

In order to trap some of the non-ferrous contaminants in the kaolin, such as $TiO_2$ which is only weakly magnetic, and which may be stained with iron, separator devices have been proposed which pass an aqueous kaolin slurry through a container that is filled with a fine packing of a highly magnetizable material (e.g. stainless steel wool) while the container is subjected to a strong magnetic field, e.g., on the order of about 7,000 gauss (0.7 Tesla) or higher. One such device is disclosed in U.S. Pat. No. 4,356,093. That device is adapted to flow the slurry in a generally radial direction through a canister containing the packing of fine stainless steel filaments. A strong annular magnet surrounds the canister and a pair of pole pieces concentrate the magnetic field through the canister. Kinks and bends in the magnetic filaments serve to concentrate the magnetic flux and form collection points for the weakly magnetic contaminant particles. The packing can be in other forms, such as a matrix of ferromagnetic strips or ribbons, which present surface irregularities to direct the slurry flow in minute tortuous channels and collect the weakly magnetizable contaminant particles.

The availability of superconducting magnets makes it possible to increase the field strength in devices of this type, i.e., producing fields exceeding 4 T (40,000 gauss). However, this high magnetic field imposes an enormous crushing force on the canister. The compressive load imposed by the magnetic field is proportional to the square of the field; if the field is doubled, the compressive force is quadrupled.

The standard inlet feed tube of the U.S. Pat. No. 4,356,093, as mentioned above, does not afford sufficient

OBJECTS AND SUMMARY OF THE INVENTION

Accordingly, it is an object of this invention to provide an increased-field-strength magnetic separator which avoids the drawbacks of the prior art.

It is another object to provide a superconducting magnetic separator which accommodates increased axial compressive loads, without reduction in capacity.

According to one aspect of this invention, a superconducting magnetic separator of the type in which a separator canister receives a slurry from an inlet tube and expels it through an outlet tube, employs a superconductor magnet that radially surrounds the canister and defines a space in which the canister fits. The canister has an upper pole piece and a lower pole piece at axial opposite ends, one of which includes a passage communicating with the inlet tube for conducting the slurry into the canister and one of which includes a passage communicating with the outlet tube to conduct the slurry out from the canister. There is an axial support post that spans between the two pole pieces and resists the high compressive forces imposed on the canister by the superconductor magnet. The post has at least one axial passage within it which communicates with a plurality of openings distributed over the surface of the post and also communicates with one of the inlet and outlet tubes. The post can have a hollow interior, or can have a solid core with an annular void as the axial passage, or a plurality of axial bores angularly spaced about a solid post axis. A suitable packing of magnetic filamentous material, e.g., stainless steel fibers, is disposed in doughnut shape over the post and serves to magnetically trap the iron compounds and other impurities in the slurry.

The above and many other objects, features, and advantages of this invention will be more fully understood from the ensuing description of a preferred embodiment, which is to be read in connection with the accompanying drawing.

DETAILED DESCRIPTION OF THE PREFERRED EMBODIMENT

Figure 1:
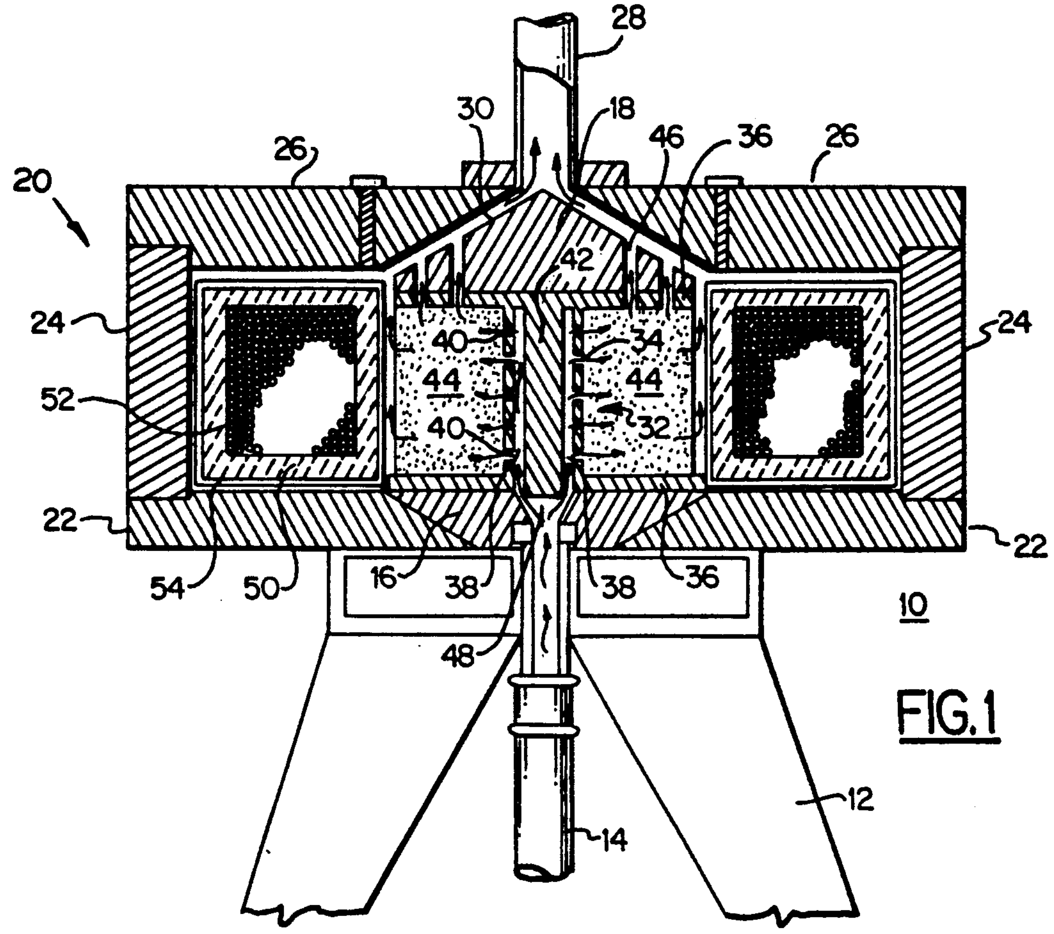
FIG. 1 is a sectional elevation of a magnetic separator according to one preferred embodiment of the present invention.

With reference to the Drawing, and initially to FIG. 1, a magnetic separator 10 according to one embodiment of this invention has a support 12 for the device, and an inlet tube 14 which serves for injecting an aqueous slurry of kaolin from below. There is a generally conical or functional lower pole piece 16 and a conical or frustoconical upper pole piece 18 separated axially from the pole piece 16. A flux return path 20 is formed of ferromagnetic, generally cylindrical members 22, 24, and 26 to conduct magnetic flux between the pole pieces 16 and 18. An outlet tube 28 is shown extending upwards from the upper pole piece 18 to conduct the processed slurry away from the device.

A generally cylindrical canister 30 is situated at the axis of the magnetic separator 10, and comprises the two pole pieces 16 and 18 and a support spool 32 that spans between these two pole pieces 16 and 18 to resist the compressive forces imposed on the canister by the sizable magnetic fields that are employed.

The spool 32 has an axial support post 34 with upper and lower end flanges 36. There is an annular void 38 serving as an axial passage, and there are a number of openings 40 through the outer wall of the support post 34 which communicate with the axial passage 38. These openings are distributed over the circumference and over the length of the post 34. In this case, there is a solid central core 42 extending along the axis of the post. A doughnut-shaped packing 44 fills the canister 30 and is preferably formed of magnetizable filaments, such as stainless steel wool, which is highly kinked and preferably is of about fifty micron diameter filament or smaller. The packing 44 can be preformed as doughnut layers of the steel filamentous material, the doughnut layers being stacked atop the next between the flanges 36,36.

Also, as shown in FIG. 1, there are passages 46 through the upper flange 36 and through the upper pole piece 18 to reach the outlet tube 28. An inlet passage 48 through the lower pole piece 16 communicates between the inlet tube 14 and the axial passage 38 of the spool 32.

An annular superconducting magnet 50 is shown surrounding the canister 30 and defining a space in which the canister is disposed. As shown here, there is a superconducting winding 52 situated within a Dewar vessel 54 that contains, e.g., liquid nitrogen and liquid helium to keep the superconducting material below the critical temperature, so that superconductance can occur. Not shown here are a power supply and conductive members bringing the current to the winding 52.

Figure 2:
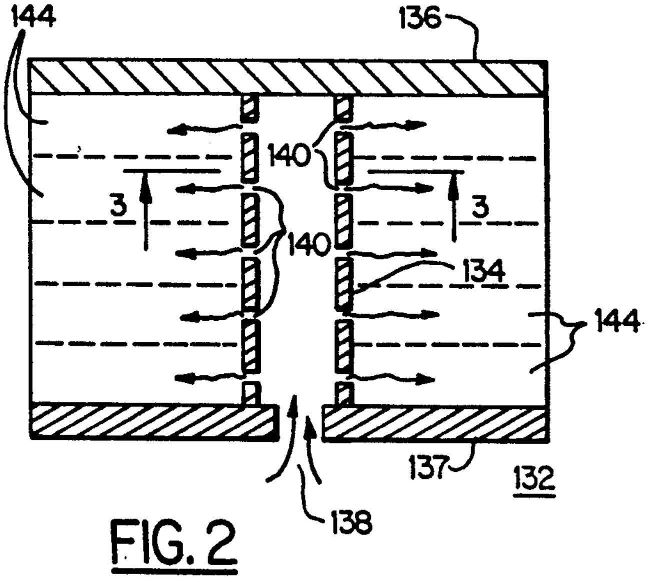
FIG. 2 is a sectional elevation of a portion of a variant of the embodiment of FIG. 1.
Figure 3:
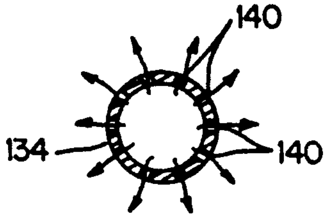
FIG. 3 is a sectional view taken across the line 3—3 of FIG. 2.

An alternative arrangement of the support spool 132 is shown in FIG. 2, in which elements corresponding to those in FIG. 1 are identified with similar reference numbers, but raised by 100. Here, the support spool 132 has a tubular hollow post 134 with a solid upper flange 136 and a lower flange 137 that has a passage 138 at the axis to conduct the slurry into the hollow center of the tubular post 134. There are openings 140 distributed over the surface of the tubular post 134 to conduct the slurry into a packing 144 of steel fibers or the like.

Figure 5:
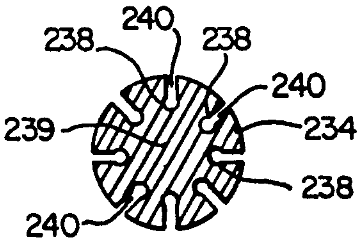
FIG. 5 is a sectional view taken across the line 5—5 of FIG. 4 .
Figure 4:
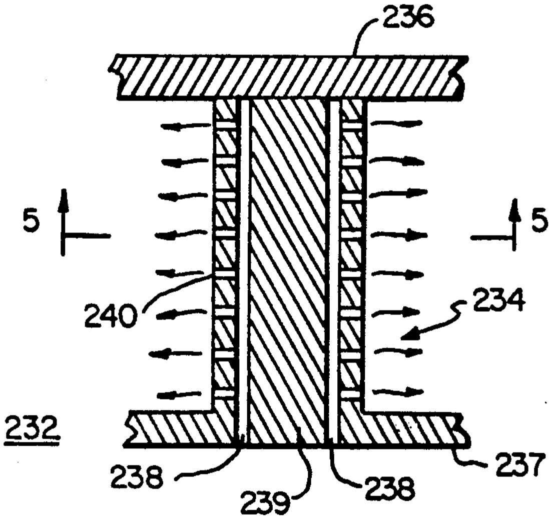
FIG. 4 is a sectional elevation of a portion of another variant of the embodiment of FIG. 1.

Yet another variant is shown in FIGS. 4 and 5, in which elements that are similar to those of FIG. 1 are identified with a like reference number, but raised by 200. In this variant, the spool 232 comprises a post 234 with a separate upper flange 236 and a lower flange 237 formed unitarily with the post. There are a plurality of axial bores 238 disposed angularly about the axis of the post 234, the latter having a solid core 239 at its axis. There are openings 240 communicating between the axial bores 238 and steel fiber packings 244.

Figure 6:
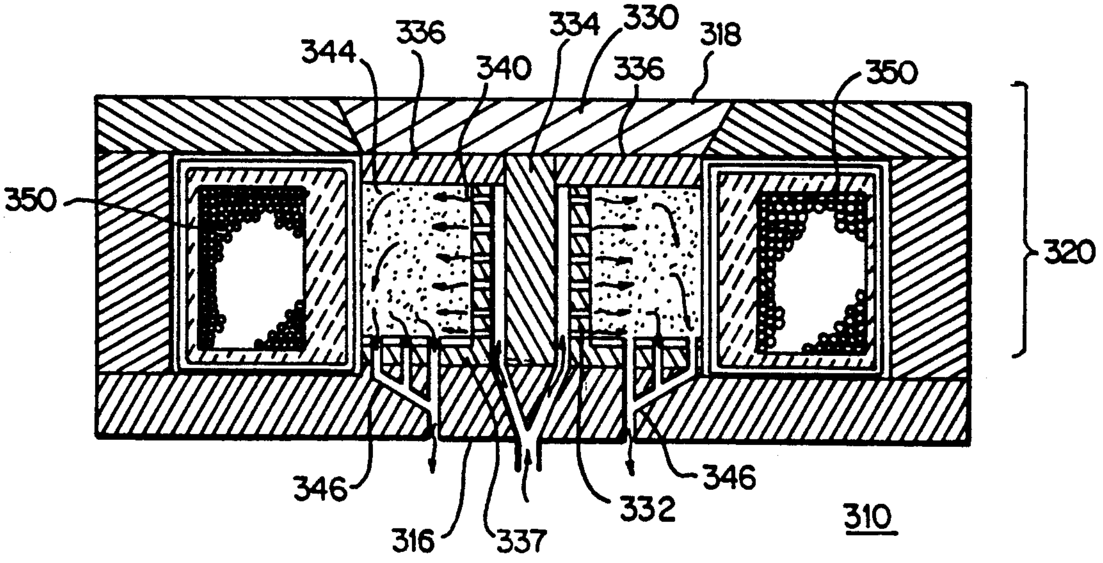
FIG. 6 is a partial sectional elevation of a second embodiment of this invention.

Another alternative construction of the magnetic separator of this invention is shown in FIG. 6, in which elements similar to those in FIG. 1 are identified with the same reference numbers, but raised by 300, and for which a detailed description is not required. Here, the magnetic separator 310 has a lower pole piece 316 and an upper pole piece 318, and a magnetic flux return path 320, as previously. A canister 330 is disposed at the axis of the separator 310 in a void defined by an annular superconducting magnet 350. In this embodiment, the support spool 332, which has a support post 334 and an upper flange 336, has a plurality of outlet openings 346 through the lower flange 337, so that the discharge slurry from the canister 330 exits downwardly to a collection ring (not shown) that conducts the output slurry to the outlet tube (not shown). In this embodiment, the lower pole piece 316 communicates with both the inlet and outlet tubes, making the canister 330 more easily accessible by eliminating the need to remove the outlet tube for access.

While the support spool 32, 132, 232 or 332 does reduce the canister size somewhat, the volume given up to make way for the support is more than made up for by the added capacity afforded by the higher magnetic field strength. The higher field strength also facilitates removal of the extremely small contaminant particles which may have a very low magnetization.

The post 34, 134, 234 or 334 can be of a non-magnetic or a diamagnetic material, so as to concentrate the magnetic flux into the matrix or packing.

While this invention has been described in detail with reference to certain preferred embodiments, it should be understood that the invention is not limited to those precise embodiments, but that many modifications and variations would present themselves to those of skill in the art without departing from the scope and spirit of this invention, as defined in the appended claims.

What is claimed is:

1. A superconducting magnetic separator which comprises a support, a separator canister, an inlet tube for injecting into said canister a slurry of water and kaolin which contains at least some ferromagnetic particles, an outlet tube for conducting the slurry from the canister, and a superconductor magnet comprising at least one superconductor coil, and Dewar means containing said coil for maintaining said superconductor coil at or below a threshold temperature at which superconductance takes place, and defining a cylindrical space coaxial with said coil in which said canister is contained, said canister comprising first and second axial pole pieces disposed on opposite ends of said canister, one of which includes means for conducting the slurry into the canister and one of which includes means for conducting the slurry from the canister; a support post extending axially from the first to the second pole piece to resist the high compressive forces imposed on the canister by the superconductor magnet, said post having at least one axial passage therein communicating with one of said inlet and outlet tubes, and a plurality of openings through a radial surface from said at least one axial passage, and a packing of ferromagnetic material filling said canister outside said post such that the slurry flow is conducted in said axial passage, through said openings and through said packing to contact the ferromagnetic particles with said packing so that said particles are removed magnetically from said slurry; and ferromagnetic means disposed outside said superconductor magnet to define a flux return path between said pole pieces.

2. The magnetic separator according to claim 1, wherein said post comprises a tube with a hollow interior that constitutes said axial passage.

3. The magnetic separator according to claim 1 wherein said post has a solid core at its axis.

4. The magnetic separator according to claim 3 wherein there are a plurality of axial bores constituting said at least one axial passage, said bores being angularly distributed about said post axis.

5. The magnetic separator according to claim 1 wherein said first and second pole piece respectively communicate said inlet and outlet tubes with the packing in said canister.

6. The magnetic separator according to claim 1 wherein said first pole piece communicates both said inlet and said outlet tubes with the packing in said canister.

* * * * *